US012625958B2

(12) United States Patent
Barton et al.

(10) Patent No.: US 12,625,958 B2
(45) Date of Patent: May 12, 2026

(54) BEHAVIOR BASED IDENTIFICATION OF MALICIOUS WORKLOADS IN A RUNTIME ENVIRONMENT

(71) Applicant: Cisco Technology, Inc., San Jose, CA (US)

(72) Inventors: Robert Edgar Barton, Richmond (CA); Bhavik Pradeep Shah, Bangalore (IN); Barry Qi Yuan, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 187 days.

(21) Appl. No.: 18/393,480

(22) Filed: Dec. 21, 2023

(65) Prior Publication Data

US 2025/0209171 A1      Jun. 26, 2025

(51) Int. Cl.
G06F 21/56        (2013.01)
G06F 21/57        (2013.01)
G06Q 10/0875    (2023.01)

(52) U.S. Cl.
CPC .......... G06F 21/566 (2013.01); G06F 21/572 (2013.01); G06F 21/577 (2013.01); G06Q 10/0875 (2013.01); *G06F 2221/033* (2013.01)

(58) Field of Classification Search
CPC .... G06F 21/566; G06F 21/572; G06F 21/577; G06F 2221/033; G06Q 10/0875
See application file for complete search history.

(56) References Cited

U.S. PATENT DOCUMENTS

| | | | |
|---|---|---|---|
| 2023/0019837 A1 | 1/2023 | Jennings | |
| 2023/0185628 A1* | 6/2023 | Lo | G06F 21/566 |
| | | | 718/1 |
| 2023/0222222 A1 | 7/2023 | Pagnozzi | |
| 2023/0315439 A1 | 10/2023 | Castrejon, III | |
| 2023/0359992 A1* | 11/2023 | Duggan | G06F 21/577 |

FOREIGN PATENT DOCUMENTS

WO          2023009624 A1      2/2023

OTHER PUBLICATIONS

CycloneDX "Authoritative Guide to SBOM" published Jun. 25, 2023 Cyclonedx.org, 63 pages.

* cited by examiner

*Primary Examiner* — Izunna Okeke
(74) *Attorney, Agent, or Firm* — Lee & Hayes, P.C.

(57)        ABSTRACT

Software bill of materials (SBOM) vulnerability systems do not monitor software components behavior in real time, and rather rely on the static periodic updates. This gap leaves cloud-native software applications exposed to 0-day or supply chain attacks that exploit vulnerabilities that are not known or updated into the public vulnerability data sources. The techniques described herein provide dynamic and intelligent identification of 0-day and supply chain attacks in runtime environments, mitigate the attacks in real-time, and share intelligence to prevent a malicious workload from being deployed through the CI/CD pipeline.

20 Claims, 6 Drawing Sheets

FIG. 1

200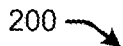

| PROCESSOR(S) 202 | NETWORK INTERFACE(S) 204 |
|---|---|

MEMORY 206

| NETWORK SERVICE FUNCTIONS 208 | NETWORK ORCHESTRATION FUNCTIONS 210 |
|---|---|
| SERVICE MANAGEMENT FUNCTIONS 212 | APPLICATION PROGRAMMING INTERFACES (APIs) 214 |
| BASELINE COMPONENT 110 | NEW WORKLOAD COMPONENT 112 |
| BEHAVIOR COMPONENT 114 | ANALYSIS AND ACTION COMPONENT 116 |

DATA STORE 216

| COMMUNICATION LIBRARIES 218 | NETWORK TOPOLOGY 220 | POLICIES 222 | USAGE DATA 224 |
|---|---|---|---|

CONTROLLER 104

GENERATE BASELINE(S) FOR CONTAINER(S) OF AN APPLICATION BASED ON FIRST
USAGE DATA
402

RECEIVE SECOND USAGE DATA
404

IDENTIFYING A CHANGE FROM A BASELINE OF A CONTAINER
406

DETERMINE THAT THE CONTAINER IS EXHIBITING MALICIOUS BEHAVIOR
408

PERFORM ACTION(S)
410

BEHAVIOR BASED IDENTIFICATION OF MALICIOUS WORKLOADS IN A RUNTIME ENVIRONMENT

TECHNICAL FIELD

The present disclosure relates generally to the field of computer networking, and more particularly to leveraging machine learning and behavior monitoring in cloud-native applications to effectively identify 0-day and supply chain attacks and other potentially malicious workloads in the runtime environment.

BACKGROUND

In a cloud-native architecture, cloud-native applications are each made up of multiple pieces (e.g., containers). Each container may have a particular function. Cloud-native applications may use software bill of materials (SBOM). SBOM is a formal record of the components and dependencies used in building software. SBOMs can help software developers, vendors, and consumers to improve security, compliance, and transparency of the software supply chain.

However, there are security concerns associated with cloud-native applications, such as 0-day attacks, which can leave vulnerabilities in the application software and allow malicious actors to attack and/or have access to the data of the cloud native applications. For instance, existing SBOM tools generally only provide reporting on the software components, their sources, and links to known vulnerabilities, which are generally pulled from a variety of publicly available sources and are static. The implication is that SBOM vulnerability systems do not monitor software components behavior in real time, and rather rely on the static periodic updates.

This gap leaves software applications exposed to 0-day or supply chain attacks that exploit vulnerabilities that are not known or updated into the public vulnerability data sources. Moreover, existing solutions fail to identify the source (e.g., library and/or database) where the software vulnerability came from. Thus, the mean time to remediate is critical for organizations to secure their applications and data. Additionally, once a workload package is deployed, current techniques do not continue to monitor the package to prevent 0-day or supply chain attacks.

Accordingly, there is a need for a dynamic and intelligent way of monitoring behavior of cloud-native application workloads deployed in a runtime environment and identifying in real-time malicious behavior and the source of the malicious behavior, such that a system can prevent an attack, while dynamically updating threat intelligence.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates a system-architecture diagram of an environment in which a system can identify and mitigate attacks in real-time in a runtime environment.

FIG. 2 illustrates a component diagram of an example controller described in FIG. 1.

DESCRIPTION OF EXAMPLE EMBODIMENTS

Overview

Figures 3A, 3B:
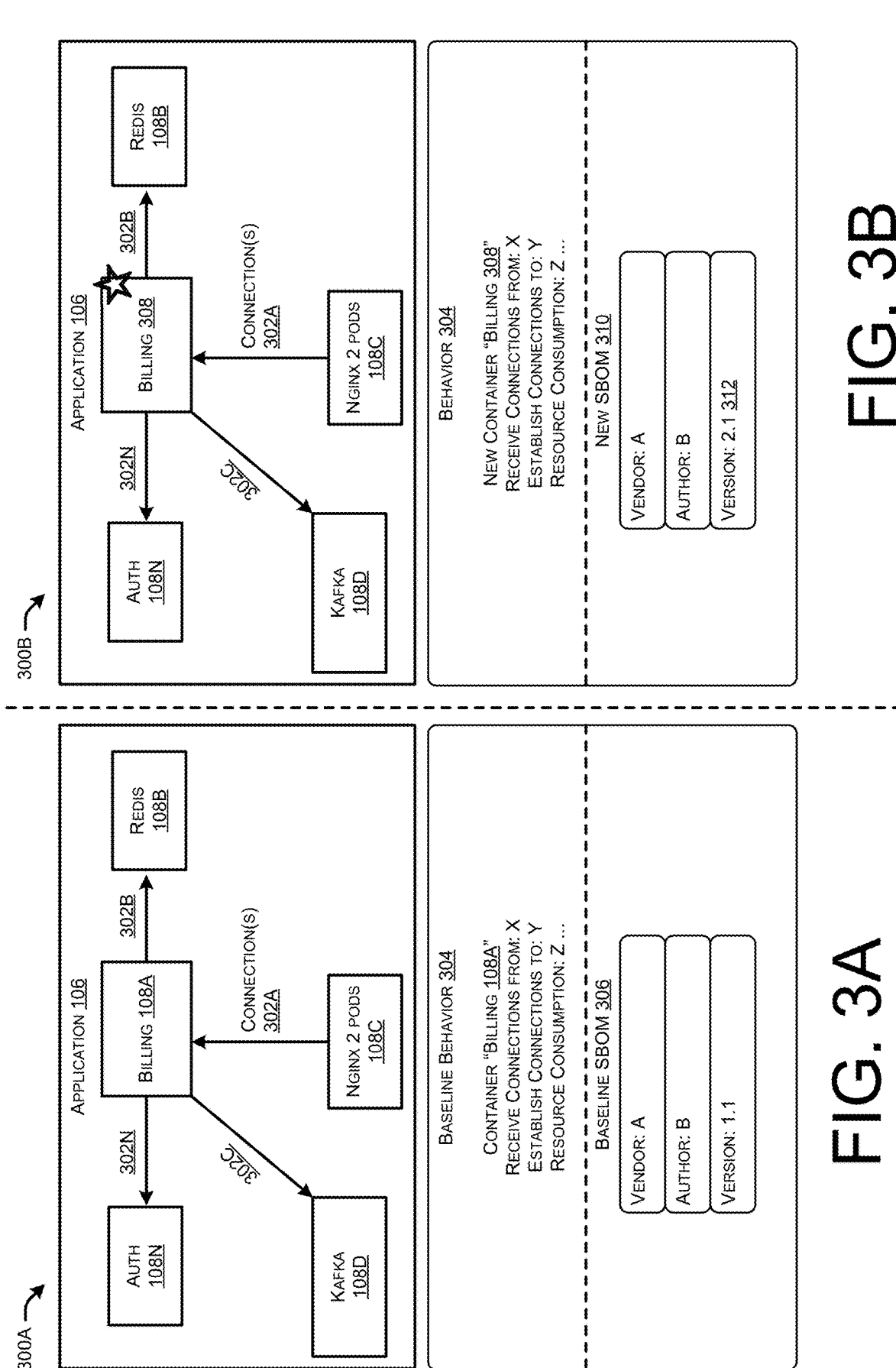
FIGS. 3A-3D illustrate example environments corresponding to the system described in FIGS. 1 and 2.

The present disclosure relates generally to the field of computer networking, and more particularly to leveraging machine learning and behavior monitoring in cloud-native applications to effectively identify 0-day and supply chain attacks and other potentially malicious workloads in the run time environment.

A method to perform the techniques described herein may be implemented by a controller. The method may include generating, based on first usage data, a baseline for a container of a plurality of containers associated with an application. The method may include receiving, from the application, second usage data associated with the container. The method may also include identifying, based on the second usage data, a change from the baseline associated with the container. The method may include determining that the container is exhibiting malicious behavior. The method may also include performing, based on the malicious behavior, an action.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

In a cloud-native architecture, cloud-native applications are each made up of multiple pieces (e.g., containers). Each container may have a particular function. Cloud-native applications may use software bill of materials (SBOM). SBOM is a formal record of the components and dependencies used in building software. SBOMs can help software developers, vendors, and consumers to improve security, compliance, and transparency of the software supply chain.

However, there are security concerns associated with cloud-native applications, such as 0-day attacks, which can leave vulnerabilities in the application software and allow malicious actors to attack and/or have access to the data of the cloud-native applications. For instance, existing SBOM tools generally only provide reporting on the software components, their sources, and links to known vulnerabilities, which are generally pulled from a variety of publicly available sources and are static. The implication is that SBOM vulnerability systems do not monitor software components behavior in real time, and rather rely on the static periodic updates.

This gap leaves software applications exposed to 0-day or supply chain attacks that exploit vulnerabilities that are not known or updated into the public vulnerability data sources.

Moreover, existing solutions fail to identify the source (e.g., library and/or database) where the software vulnerability came from. Thus, the mean time to remediate is critical for organizations to secure their applications and data. Additionally, once a workload package is deployed, current techniques do not continue to monitor the package to prevent 0-day or supply chain attacks.

Accordingly, there is a need for a dynamic and intelligent way of monitoring behavior of cloud-native application workloads deployed in a runtime environment and identifying in real-time malicious behavior and the source of the malicious behavior, such that a system can prevent an attack, while dynamically updating threat intelligence.

This disclosure describes techniques and mechanisms for a system to dynamically and intelligently identify and mitigate attacks in a runtime environment. In some examples, the system may generate, based on first usage data, a baseline for a container of a plurality of containers associated with an application. The system may receive, from the application, second usage data associated with the container. The system may identify, based on the second usage data, a change from the baseline associated with the container. The system may determine that the container is exhibiting malicious behavior. The system may perform, based on the malicious behavior, an action.

In some examples, the system may comprise a baseline component. In some examples, the baseline component may utilize usage data to generate a baseline for each container. In some examples, the baseline component may additionally or alternatively utilize one or more vulnerability and/or threat libraries. For instance, similar to existing techniques, when a workload is introduced to the system for the first time, the system may utilize a static list of vulnerability information to determine whether a workload of a container comprises any known vulnerabilities and to generate a baseline SBOM for the container. In this example, where the baseline component determines the workload does not contain a known vulnerability, the baseline component may deploy the new container and may continue to monitor the new container to generate a baseline of associated behaviors and/or functions.

In some examples, such as where an existing container is being upgraded, the system may initially determine whether the new workload comprises any known vulnerability using the static list of vulnerability information from a vulnerability database. In some examples, such as where the new workload does not contain a known vulnerability, the baseline component may then generate a baseline SBOM using one or more SBOMs included in previous usage data collected from the application. The baseline component may generate a baseline of behaviors of the container based on the usage data. For instance, the baseline component may determine functions the container generally performs, connections the container makes, connections the container receives, resource consumption by the container, etc. In some examples, the baseline component may generate and store a list. In some examples, the list may be generated based on the usage data. In some examples, the list may comprise an indication of all the containers within an application, what function(s) and/or operation(s) are performed by each container, and/or a breakdown of the SBOM for each container.

In some examples, the system may comprise a new workload component. For instance, where a new workload is introduced and passes an initial check by the baseline component, the new workload component may mark the new workload as new and enable the new workload to be tracked by the system. For instance, when a container is updated (e.g., such as function(s) and/or capabilities are added to the container, update the software of the container to a newer version, etc.), the new workload component may identify the new workload of the container as new and enable the system to track the new workload. In some examples, the new workload component may identify whether the SBOM of the container has changed. For instance, the new workload component may identify whether a new library is implemented in the new workload, etc. Additionally, the new workload component may identify any new connections enabled by the new workload. Accordingly, the system may use the baseline of the new workload and the container, together with the SBOM data, to trace back if malicious activity is identified by a local security device (e.g., NGFW, IPS, etc.).

In some examples, the system may comprise a behavior component. In some examples, the behavior component monitors a new workload after deployment. In some examples, the behavior component may identify potential malicious behavior of a new workload. For instance, the behavior component may identify new connection(s) being formed by the new workload that were not formed previously (e.g., as indicated by the baseline behaviors of the container).

In some examples, potential malicious behavior includes, but is not limited to one or more of the following: forming C2 (Command and control) connections and/or communicating to known C2 hosts; data exfiltration (for example, emulating DNS request and smuggling data out); accepting malicious external access (e.g., geolocation or known malicious sources); accepting out of spec calls (e.g., by referencing customer defined API specs); sending malicious traffic SPAM, phishing, scanning, recon, DDOS participation, etc.; monitoring performance and resource consumption, such as (i) if a workload consumes too much resource; (ii) keeps crashing or reloading; and (iii) generating too much log data; or any other behavior that may indicate malicious behavior.

In some examples, when a potential malicious behavior is identified, the behavior component may determine metadata associated with the new workload (e.g., the new SBOM and dependency information) and may provide the metadata to the analysis and action component. Accordingly, the system may trace back to the exact software package that initiated an attack.

In some examples, the system may comprise an analysis and action component. In some examples, Once the malicious workload is identified, its meta data (SBOM and dependencies) are collected and an analysis mechanism assigns a confidence score to a verdict that indicates how malicious the behavior is likely to be. In some examples, the analysis and action component may comprise one or more machine learning models. In some examples, the machine learning models may be trained using historic metadata associated with known malicious activity. In some examples, the metadata may input into the machine learning model and a confidence score may be output, the confidence score indicating a likelihood that the new behavior is malicious.

Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs. In some examples, the machine learning models include deep learning models, such as convolutional neural networks (CNN), deep learning neural networks (DNN), and/or artificial intelligence models. The term "neural network," and its equivalents, may refer to a model with multiple hidden layers, wherein the model receives an input (e.g., a vector) and transforms the input by performing operations via the hidden layers. An individual hidden layer may include multiple "neurons," each of which may be disconnected from other neurons in the layer. An individual neuron within a particular layer may be connected to multiple (e.g., all) of the neurons in the previous layer. A neural network may further include at least one fully-connected layer that receives a feature map output by the hidden layers and transforms the feature map into the output of the neural network. In some examples, the neural network comprises a graph where each node of the graph represents a layer within the neural network. Each node may be connected as part of a chain (e.g., a concatenation of layers). In some examples, input may be received by a node within the graph, the input is computed by the node and gets passed to one or more additional nodes in the chain.

In some examples, the analysis and action component may determine that behavior is malicious based on the confidence score being above a threshold score. For instance, as malicious activity increases, the confidence score increases proportionally, such that the higher the confidence score, the more likely the behavior is to be malicious. In some examples, the type of behavior may be afforded different weights by the machine learning models. For instance, as C2 connections are generally indicative of a ransomware attack, a 0-day attack, and/or a supply chain attack, an indication of a new C2 connection may be assigned a greater weight than if the new workload is only causing the application to crash. In some examples, the analysis and action component may determine that behavior is malicious based on multiple behaviors being identified. For instance, where there is data exfiltration and crashing behavior, the analysis and action component may determine the behavior is malicious and the confidence score may be above a particular threshold.

In some examples, the analysis and action component may perform one or more actions based on determining the behavior is malicious behavior. For instance, the analysis and action component may send instructions to the application to cause the application to block any new C2 connections from being formed. For instance, by identifying a new C2 connection based on the baseline behavior of a container, the analysis and action component can (i) identify the new connection and (ii) block the connection in real-time. Additionally, the analysis and action component may identify, based on the baseline, the source of the malicious behavior. For instance, where the SBOM indicates that a new library has been implemented, the analysis and action component may determine that the new, malicious behavior is likely caused by the new library.

In some examples, the analysis and action component may collect the verdict (e.g., determination that the behavior is malicious or not and the confidence score) and additional SBOM information (e.g., vendor, author, version, etc.) is collected and reported to a threat reporting system. In some examples, the threat reporting system may correspond to Cisco's TALOS. In some examples, this information is then shared across customers organization, as well as all other workload security solutions that are subscribed to this behavior based SBOM solution. The malicious workload may then be blocked across the organization and/or across the wider organization according to policy. In some examples, the analysis and action component may update a vulnerability database of the system to include the information associated with the new workload, such that the database is updated in real-time.

In this way, the system may identify, workloads that may not be identified as malicious by traditional approaches, but are being used in the wrong way and may have malicious behaviors. Moreover, the system may mitigate the attack by blocking connections in real-time after the workload is deployed. Further, by offering granular visibility using the SBOM baseline for a container, the system may provide greater accuracy and verdicts as to whether behavior is malicious. Additionally, by tracking down to the exact library that provided a change that caused the new malicious behavior of a container, the system can trace back to the exact package that is malicious, which can be shared across the cloud-native ecosystem. That is, the system may share the intelligence across the ecosystem to prevent the same malicious workload from being deployed through the CI/CD pipeline.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
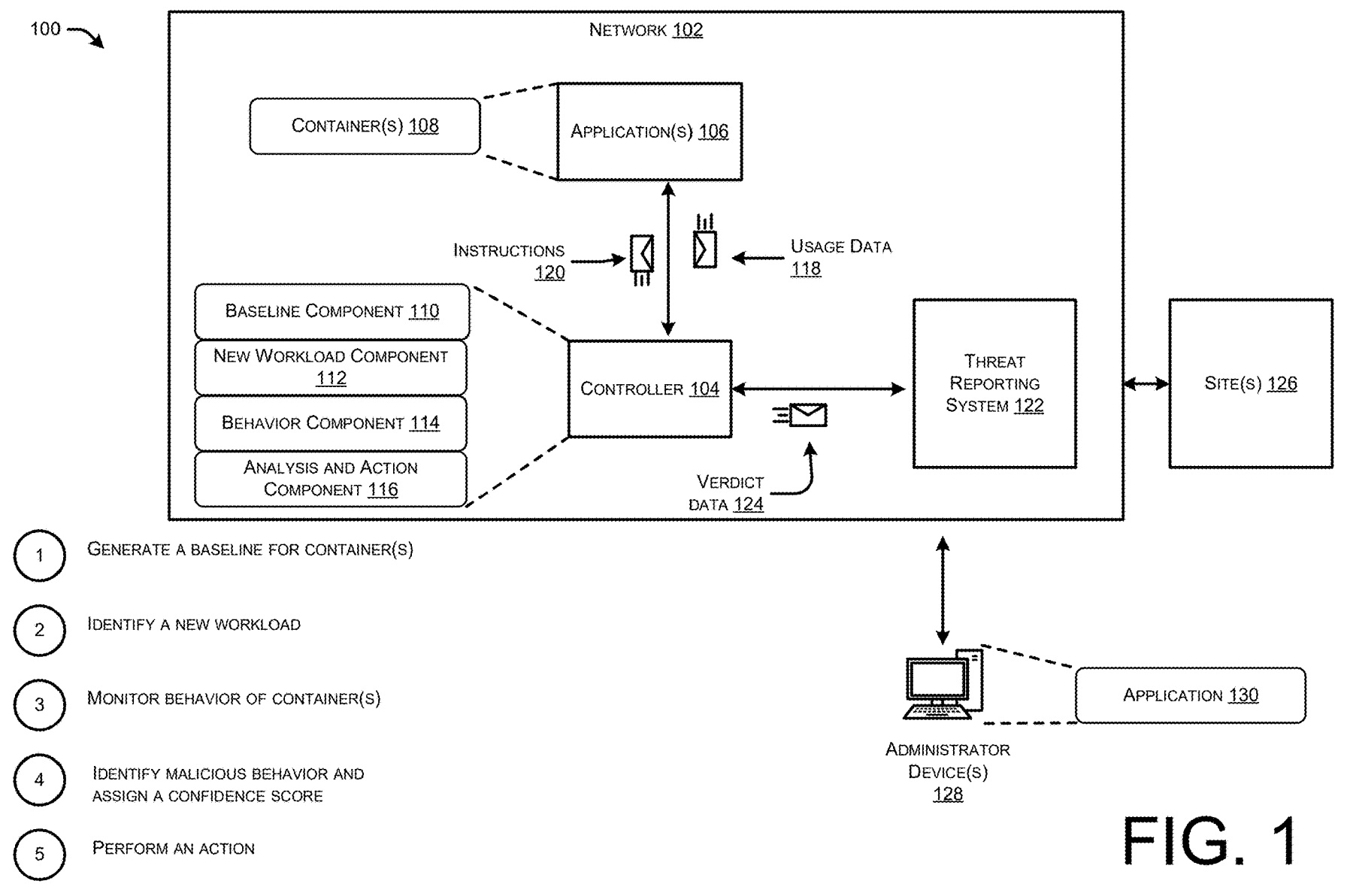

FIG. 1 illustrates a system-architecture diagram of an environment in which a system 100 can identify and mitigate attacks in real-time in a runtime environment. While the system 100 shows an example controller 104, it is understood that any of the components of the system may be implemented on any device in the network 102. Moreover, while the system 100 shows the example controller 104 as being included as part of the network 102, it is understood that the controller 104 and/or any of the components of the system may be implemented as part of an on premise solution. For instance, the controller 104 may be included as part of a software package that is configured to be deployed within an environment of a user, such as a customer.

In some examples, the system 100 may include a network 102 that includes network devices. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), RA VPNs, VPNs, ZTNA, Wide Area Networks (WANs)—both centralized and/or distributed—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

In some examples, the network 102 comprises a cloud network. In some examples, the network 102 may comprise a cloud service and/or a SaaS service, such as Cisco's Cloud service.

The system 100 may comprise a controller 104. In some examples, the controller 104 corresponds to a system that has complete visibility into the security fabric of a given network (e.g., enterprise network, smaller network, etc.). In some examples, the controller 104 may comprise a network orchestrator, one or more processors, etc., In some examples, the controller 104 may be integrated as part of a SaaS service. In some examples, the controller may be integrated as part of Cisco's Cloud.

As illustrated the controller 104 may comprise a baseline component 110, a new workload component 112, a behavior component 114, and/or an analysis and action component 116. As described in greater detail below, the baseline component 110 is configured to generate a baseline SBOM and baseline behaviors for each container 108 of an application 106. The baseline component 110 may utilize a vulnerability database to identify if a workload for a container contains any known vulnerabilities. The baseline component may generate a baseline of behaviors of the container based on the usage data. For instance, the baseline component may determine functions the container generally performs, connections the container makes, connections the container receives, resource consumption by the container, etc. In some examples, the baseline component may generate and store a list. In some examples, the list may be generated based on the usage data. In some examples, the list may comprise an indication of all the containers within an application, what function(s) and/or operation(s) are performed by each container, and/or a breakdown of the SBOM for each container.

In some examples, the new workload component 112 is configured to tag a new workload as new and identify any changes in a baseline for a new workload by comparing the SBOM and behavior baselines for the new workload with the baseline of the existing container. For instance, where a new workload is introduced and passes an initial check by the baseline component (e.g., such that the new workload does not contain any known vulnerabilities), the new workload component may mark the new workload as new and enable the new workload to be tracked by the system. For instance, when a container is updated (e.g., such as function(s) and/or capabilities are added to the container, update the software of the container to a newer version, etc.), the new workload component may identify the new workload of the container as new and enable the system to track the new workload. In some examples, the new workload component may identify whether the SBOM of the container has changed. For instance, the new workload component may identify whether a new library is implemented in the new workload, etc. Additionally, the new workload component may identify any new connections enabled by the new workload. Accordingly, the system may use the baseline of the new workload and the container, together with the SBOM data, to trace back if malicious activity is identified by a local security device (e.g. NGFW, IPS, etc.).

As described in greater detail below, the behavior component 114 is configured to monitor the new workload after it has been deployed. In some examples, the behavior component may identify potential malicious behavior of a new workload. For instance, the behavior component may identify new connection(s) being formed by the new workload that were not formed previously (e.g., as indicated by the baseline behaviors of the container. In some examples, when a potential malicious behavior is identified, the behavior component may determine metadata associated with the new workload (e.g., the new SBOM and dependency information) and may provide the metadata to the analysis and action component. Accordingly, the system may trace back to the exact software package that initiated an attack.

As described in greater detail below, the analysis and action component 116 is configured to collect metadata associated with a new workload identified as malicious, generate and assign a confidence score, and perform action(s) to mitigate the malicious behavior in real-time and prevent the new workload from being deployed elsewhere within the network and/or system.

The controller 104 may be configured to communicate with one or more application(s) 106. In some examples, the application(s) 106 may comprise cloud-native applications. As illustrated, the application(s) 106 may comprise one or more container(s) 108. As noted above, each of the container(s) 108 may comprise a workload and may perform one or more function(s) and/or operation(s) for the application(s) 106. As noted above, where the application(s) 106 comprise a cloud-native application, the container(s) 108 each perform a limited set of function(s). As shown in greater detail below, each of the container(s) 108 is configured to form connections (e.g., HTTPS and/or via API calls) with one or more other container(s) 108 and/or third-party sources.

In some examples, the controller 104 may be configured to receive usage data 118 from the application(s) 106. In some examples, the usage data 118 comprises data and/or metadata (e.g., which application is used, by which station, traffic characteristics and duration, etc.) associated with the application(s) 106 and/or each container 108 of the application. In some examples, the usage data 118 may comprise one or more SBOMs associated with each of the containers 108. In some examples, the usage data 118 may comprise data and/or metadata indicating connection(s) formed by each container 108, API calls made by each container 108, requests and/or information sent by each container 108, privileges associated with each container 108, resource consumption for each container 108, etc. In some examples, the system may store the usage data 118 as part of the system and/or controller 104 (e.g., such as in a database and/or memory associated with the controller 104).

In some examples, the controller 104 is configured to send instructions 120 to the application(s) 106. For instance, the instructions 120 may comprise one or more action(s) to be taken in association with one or more container(s) 108. For instance, where malicious behavior (e.g., such as a new C2 connection is being formed) is identified for a particular container, the controller 104 may send instructions to the particular container to block the C2.

In some examples, the controller 104 is configured to communicate with a threat reporting system 122. In some examples, the threat reporting system 122 may correspond to Cisco's TALOS. In some examples, the controller 104 may send verdict data 124 to the threat reporting system 122. In some examples, the verdict data 124 comprises indications of an identified malicious behavior, a confidence score, a source of the malicious behavior, changes in a baseline SBOM and/or baseline behavior(s) of a container, etc. In some examples, the indication of the source may comprise an indication of a particular library, a particular, vendor, a particular, author, etc. associated with a change in behavior of a particular container. In some examples, the threat reporting system 122 may share, in real-time, the verdict data 124 with site(s) 126 and/or other aspects of the network 102 to prevent the malicious workload from being deployed elsewhere in the network 102.

In some examples, the controller 104 and/or threat reporting system 122 may store the verdict data 124 in a vulnerability database associated with network 102 and/or system 100. In some examples, the vulnerability database may be updated in real-time.

In some examples, the system 100 comprises site(s) 126 that are configured to communicate with the network 102, the threat reporting system 122, the controller 104, application(s) 106, etc., In some examples, the site(s) 126 comprise one or more server(s), enterprise network(s) and/or service(s) associated with a service provider, one or more network device(s), etc. In some examples, the site(s) 126 correspond to one or more data center(s) comprising various network components, such as, for example, network switch(es) (also referred to as node(s)) operating on physical servers. In some examples, the site(s) 126 may comprise physical server(s) that may host one or more virtual machines. Each virtual machine may be configured to execute one of various operations and act as one or more virtual components for the cloud network(s) and/or enterprise/application network. In some examples, the physical server(s) may host any number of virtual machines. In some examples, the physical server(s) in the enterprise/application network may host the various network components of the enterprise/application network.

In some examples, administrator device(s) 128 may be configured to communicate with any component of the network 102. For instance, the administrator device(s) 128 may send instructions to one or more site(s) and/or branches via the controller 104. In some examples, the instructions may comprise instructions to block or allow access to a particular container 108. In some examples, the instructions may comprise instructions to upgrade one or more of the container(s) 108, update the container(s) 108, etc.

In some examples, the controller 104 may be configured to communicate with administrator device(s) 128. As illustrated, the administrator device(s) 128 may comprise an application 130. In some examples, the application 130 may correspond to an application provided by a service provider (e.g., such as Cisco) that enables an administrator of the network 102 to access the controller 104. In some examples, the controller 104 may be configured to send the verdict data 124 and/or any other data described herein to the application 130 for display via a user interface.

At "1", the system may generate a baseline for container(s). In some examples, the baseline may be generated for a new workload associated with a new container being introduced to an application. In some examples, the baseline may be generated for a new workload that is updating and/or adding a new functionality to an existing container. As noted above, the baseline may comprise a baseline SBOM associated with a container and baseline behavior(s) associated with the container. The baseline may be generated by the baseline component.

At "2", the system may identify a new workload. For instance, an administrator may send instructions to add a new functionality to a particular container 108. In some examples, the new workload is identified and tagged by the new workload component 112.

At "3", the system may monitor behavior of the container(s). In some examples, the behavior of the container(s) 108 is monitored after the new workload is deployed. In some examples, the behavior of the container(s) 108 and/or new workload is monitored by the behavior component 114.

At "4", the system may identify malicious behavior and assign a confidence score. For instance, the system may identify the malicious behavior using the behavior component 114. In some examples, the system may generate and assign a confidence score associated with the malicious behavior using the analysis and action component 116.

At "5", the system may perform an action. For instance, the action may be performed using the action and analysis component 116. In some examples, the action(s) may comprise blocking connection(s), updating a vulnerability database, sending verdict data 124 to a threat reporting system 122, displaying the verdict data 124 on an administrator device 128, etc. In some examples, the action(s) are performed in real-time.

In this way, the system may identify, workloads that may not be identified as malicious by traditional approaches, but are being used in the wrong way and may have malicious behaviors. Moreover, the system may mitigate the attack by blocking connections in real-time after the workload is deployed. Further, by offering granular visibility using the SBOM baseline for a container, the system may provide greater accuracy and verdicts as to whether behavior is malicious. Additionally, by tracking down to the exact library that provided a change that caused the new malicious behavior of a container, the system can trace back to the exact package that is malicious, which can be shared across the cloud-native ecosystem. That is, the system may share the intelligence across the ecosystem to prevent the same malicious workload from being deployed through the CI/CD pipeline.

FIG. 2 illustrates a component diagram of an example controller described in FIG. 1. In some instances, the controller 104 may run on one or more computing devices in, or associated with, the network 102 (e.g., a single device or a system of devices). In some instances, the controller 104 may be integrated as part of a cloud native environment, such as a cloud-based management solution (e.g., such as Cisco's Cloud and/or Cisco's SaaS service) and/or an on-premise solution.

Generally, the controller 104 may include a programmable controller that manages some or all of the controller activities of the network 102, and manages or monitors the network state using one or more centralized control models.

As illustrated, the controller 104 may include, or run on, one or more hardware processors 202 (processors), one or more devices, configured to execute one or more stored instructions. The processor(s) 202 may comprise one or more cores. Further, the controller 104 may include or be associated with (e.g., communicatively coupled to) one or more network interfaces 204 configured to provide communications with network device(s), the edge device(s), and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDCI's, and so forth. For example, the network interfaces 204 may include devices compatible with any networking protocol.

The controller 104 may also include memory 206, such as computer-readable media, that stores various executable components (e.g., software-based components, firmware-based components, etc.). The memory 206 may generally store components to implement functionality described herein as being performed by the controller 104. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the controller 104.

The controller 104 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various controller functions to occur.

In some examples, the controller 104 may include a baseline component 110. In some examples, the baseline component 110 may utilize usage data to generate a baseline for each container. In some examples, the baseline component may additionally or alternatively utilize one or more vulnerability and/or threat libraries. For instance, similar to existing techniques, when a workload is introduced to the system for the first time, the system may utilize a static list of vulnerability information to determine whether a workload of a container comprises any known vulnerabilities and to generate a baseline SBOM for the container. In this example, where the baseline component determines the workload does not contain a known vulnerability, the baseline component may deploy the new container and may continue to monitor the new container to generate a baseline of associated behaviors and/or functions.

In some examples, such as where an existing container is being upgraded, the baseline component 110 may initially determine whether the new workload comprises any known vulnerability using the static list of vulnerability information from a vulnerability database. In some examples, such as where the new workload does not contain a known vulnerability, the baseline component 110 may then generate a baseline SBOM using one or more SBOMs included in previous usage data collected from the application.

In some examples, the baseline component 110 may generate a baseline of behaviors of the container based on the usage data. For instance, the baseline component 110 may determine functions the container generally performs, connections the container makes, connections the container receives, resource consumption by the container, etc. In some examples, the baseline component may generate and store a list. In some examples, the list may be generated based on usage data received from an application. In some examples, the list may comprise an indication of all the containers within the application, what function(s) and/or operation(s) are performed by each container, and/or a breakdown of the SBOM for each container.

The controller 104 may include a new workload component 112. For instance, where a new workload is introduced and passes an initial check by the baseline component 110, the new workload component 112 may mark the new workload as new and enable the new workload to be tracked. For instance, when a container is updated (e.g., such as function(s) and/or capabilities are added to the container, update the software of the container to a newer version, etc.), the new workload component 112 may identify the new workload of the container as new and enable the system to track the new workload. In some examples, the new workload component may identify whether the SBOM of the container has changed. For instance, the new workload component 112 may identify whether a new library is implemented in the new workload, etc. Additionally, the new workload component 112 may identify any new connections enabled by the new workload.

The controller 104 may include a behavior component 114. In some examples, the behavior component monitors a new workload after deployment. In some examples, the behavior component may identify potential malicious behavior of a new workload. For instance, the behavior component may identify new connection(s) being formed by the new workload that were not formed previously (e.g., as indicated by the baseline behaviors of the container).

In some examples, potential malicious behavior includes, but is not limited to one or more of the following: forming C2 (Command and control) connections and/or communicating to known C2 hosts; data exfiltration (for example, emulating DNS request and smuggling data out); accepting malicious external access (e.g., geolocation or known malicious sources); accepting out of spec calls (e.g., by referencing customer defined API specs); sending malicious traffic SPAM, phishing, scanning, recon, DDOS participation, etc.; monitoring performance and resource consumption, such as (i) if a workload consumes too much resource; (ii) keeps crashing or reloading; and (iii) generating too much log data; or any other behavior that may indicate malicious behavior.

In some examples, when a potential malicious behavior is identified, the behavior component may determine metadata associated with the new workload (e.g., the new SBOM and dependency information) and may provide the metadata to the analysis and action component. Accordingly, the controller may trace back to the exact software package that initiated an attack.

In some examples, the behavior component 114 is configured to monitor the behavior of the container(s) using a agent-based deployment on the new workload. In some examples, the agent-based deployment may comprise a lightweight agent installed on the new workloads or a daemon set that intercepts all traffic of an application and sends the usage data to the controller.

In some examples, the behavior component 114 is configured to monitor the behavior of the container(s) using an agentless approach. For instance, in a Kubernetes environment, the behavior component may leverage a service mesh (e.g., such as Istio service mesh) to monitor usage data. In some examples, the behavior component may leverage an API gateway. In other examples, such as where the controller is deployed as an on premise solution, the behavior component 114 may receive usage data of an application and/or new workload via an on premise sensor.

In some examples, when any malicious behavior is detected, the behavior component 114 may trace the malicious behavior back to the exact software package which initiated the attack. For instance, in an agent-based deployment, the behavior component can identify the changed SBOM and/or changed behavior of a container, along with the new workload tag and metadata associated with the new workload to identify the new workload as being potentially malicious. In a Kubernetes environment, the behavior component 114 may be configured to communicate with a service mesh envoy proxy that intercepts connections and helps to trace malicious connections back to a source. In this example, the behavior component 114 may utilize the usage data from the service mesh envoy proxy, along with the metadata and tag associated with the new workload to identify the newly deployed workload as being potentially malicious. Further, in another embodiment, the behavior component 114 may be configured to utilize the source IP of a malicious connection (e.g., which can be used to trace to the initiating source workload), along with the metadata associated with the new workload and the tagged new workload to identify the newly deployed workload as being potentially malicious.

The controller 104 may include an analysis and action component 116. In some examples, the analysis and action component 116 is configured to collect metadata associated with a new workload identified as malicious, generate and assign a confidence score, and perform action(s) to mitigate the malicious behavior in real-time and prevent the new workload from being deployed elsewhere within the network and/or system.

In some examples, once the malicious workload is identified, its metadata (SBOM and dependencies) are collected and an analysis mechanism assigns a confidence score to a verdict that indicates how malicious the behavior is likely to be. In some examples, the analysis and action component 116 may comprise one or more machine learning models. In some examples, the machine learning models may be trained using historic metadata associated with known malicious activity. In some examples, the metadata may input into the machine learning model and a confidence score may be output, the confidence score indicating a likelihood that the new behavior is malicious.

Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs. In some examples, the machine learning models include deep learning models, such as convolutional neural networks (CNN), deep learning neural networks (DNN), and/or artificial intelligence models. The term "neural network," and its equivalents, may refer to a model with multiple hidden layers, wherein the model receives an input (e.g., a vector) and transforms the input by performing operations via the hidden layers. An individual hidden layer may include multiple "neurons," each of which may be disconnected from other neurons in the layer. An individual neuron within a particular layer may be connected to multiple (e.g., all) of the neurons in the previous layer. A neural network may further include at least one fully-connected layer that receives a feature map output by the hidden layers and transforms the feature map into the output of the neural network. In some examples, the neural network comprises a graph where each node of the graph represents a layer within the neural network. Each node may be connected as part of a chain (e.g., a concatenation of layers). In some examples, input may be received by a node within the graph, the input is computed by the node and gets passed to one or more additional nodes in the chain.

In some examples, the analysis and action component 116 may determine that behavior is malicious based on the confidence score being above a threshold score. For instance, as malicious activity increases, the confidence score increases proportionally, such that the higher the confidence score, the more likely the behavior is to be malicious. In some examples, the type of behavior may be afforded different weights by the machine learning models. For instance, as C2 connections are generally indicative of a ransomware attack, a 0-day attack, and/or a supply chain attack, an indication of a new C2 connection may be assigned a greater weight than if the new workload is only causing the application to crash. In some examples, the analysis and action component may determine that behavior is malicious based on multiple behaviors being identified. For instance, where there is data exfiltration and crashing behavior, the analysis and action component may determine the behavior is malicious and the confidence score may be above a particular threshold.

In some examples, the analysis and action component 116 may perform one or more actions based on determining the behavior is malicious behavior. For instance, the analysis and action component may send instructions to the application to cause the application to block any new C2 connections from being formed. For instance, by identifying a new C2 connection based on the baseline behavior of a container, the analysis and action component can (i) identify the new connection and (ii) block the connection in real-time. Additionally, the analysis and action component may identify, based on the baseline, the source of the malicious behavior. For instance, where the SBOM indicates that a new library has been implemented, the analysis and action component may determine that the new, malicious behavior is likely caused by the new library.

In some examples, the analysis and action component 116 may collect the verdict (e.g., determination that the behavior is malicious or not and the confidence score) and additional SBOM information (e.g., vendor, author, version, etc.) is collected and reported to a threat reporting system. In some examples, the threat reporting system may correspond to Cisco's TALOS. In some examples, this information is then shared across customers organization, as well as all other workload security solutions that are subscribed to this behavior based SBOM solution. The malicious workload may then be blocked across the organization and/or across the wider organization according to policy. In some examples, the analysis and action component may update a vulnerability database of the system to include the information associated with the new workload, such that the database is updated in real-time.

The controller 104 may further include a data store 216, such as long-term storage, that stores communication libraries 218 for the different communication protocols that the controller 104 is configured to use or perform. Additionally, the data store 216 may include network topology data 220, such as a model representing the layout of the network components in the network 102 and/or data indicating available bandwidth, available CPU, delay between nodes, computing capacity, processor architecture, processor type(s), etc., The data store 216 may store policies 222 that include security data associated with the network, security policies configured for the network, firewall policies, firewall configuration data, network configuration policies, network configuration data, security posture data, and/or compliance policies configured for the network. The data store 216 may store usage data 232 including metadata, SBOMs, behavior data, network data, or any other data and/or information described herein.

FIGS. 3A-3D illustrates example behavior and baselines used by the system to monitor and identify malicious workloads in a runtime environment associated with the system described in FIGS. 1 and 2.

FIG. 3A corresponds to an example environment 300A where a baseline is set for a particular container within a cloud-native application. In some examples, one or more of the components of environments 300A, 300B, 300C, and/or 300D may be displayed on a user interface of an administrator device. In some examples, the environment 300A illustrates the outcome of the baseline component 110 performing one or more operations described above.

As illustrated in FIG. 3A, the environment 300A includes an application 106 that corresponds to a cloud-native application. The application 106 comprises a plurality of containers 108. For instance, the containers 108 comprise a billing container 108A, a redis container 108B, a nginx 2 pods container 108C, a kafka container 108D, and an auth container 108N. Each of the container(s) 108 are configured to send queries and/or receive responses from other container(s) 108. As illustrated, the container(s) 108 form connection(s) 302 with other container(s) within the cloud-native application. In some examples, the connection(s) 302 comprise API calls that are made between each of the container(S) 108. Information associated with each of these container(s) 108 can be included as part of the behavior data included in the usage data the controller receives. As illustrated, the baseline behavior 304 of the billing container 108A may indicate which container(s) the billing container receives connection(s) 302 from, establishes connection(s) 302 to, resource consumption data, etc. Additionally, the environment 300A illustrates an example baseline SBOM 306 for the billing container 108A. As illustrated the baseline SBOM 306 indicates that vendor A, author B, and version 1.1 are associated with the billing container 108A. As noted above, the SBOM can comprise a plurality of additional information and/or fields and is not limited to the fields illustrated.

FIG. 3B illustrates an example environment 300B, where a new workload is deployed. In particular, the new workload corresponds to the billing container 108A. In some examples, the environment 300B illustrates the outcome of the new workload component 112 performing one or more operations described above.

As illustrated, the new billing container 308 is tagged as new (illustrated by the star). Additionally, the behavior associated with the new billing container 308 is listed, using the baseline behavior of billing container 108A as a reference. That is, the connection(s) the new billing container 308 is configured to receive and establish, as well as resources consumed is not expected to change with the new workload. As illustrated, a new SBOM 310 is also listed. As indicated in the new SBOM 310, the vendor and author have not changed. However, the new SBOM 310 does indicate that a new version of software (e.g., version 2.1 312) is implemented by the new billing container 308.

Figures 3C, 3D:
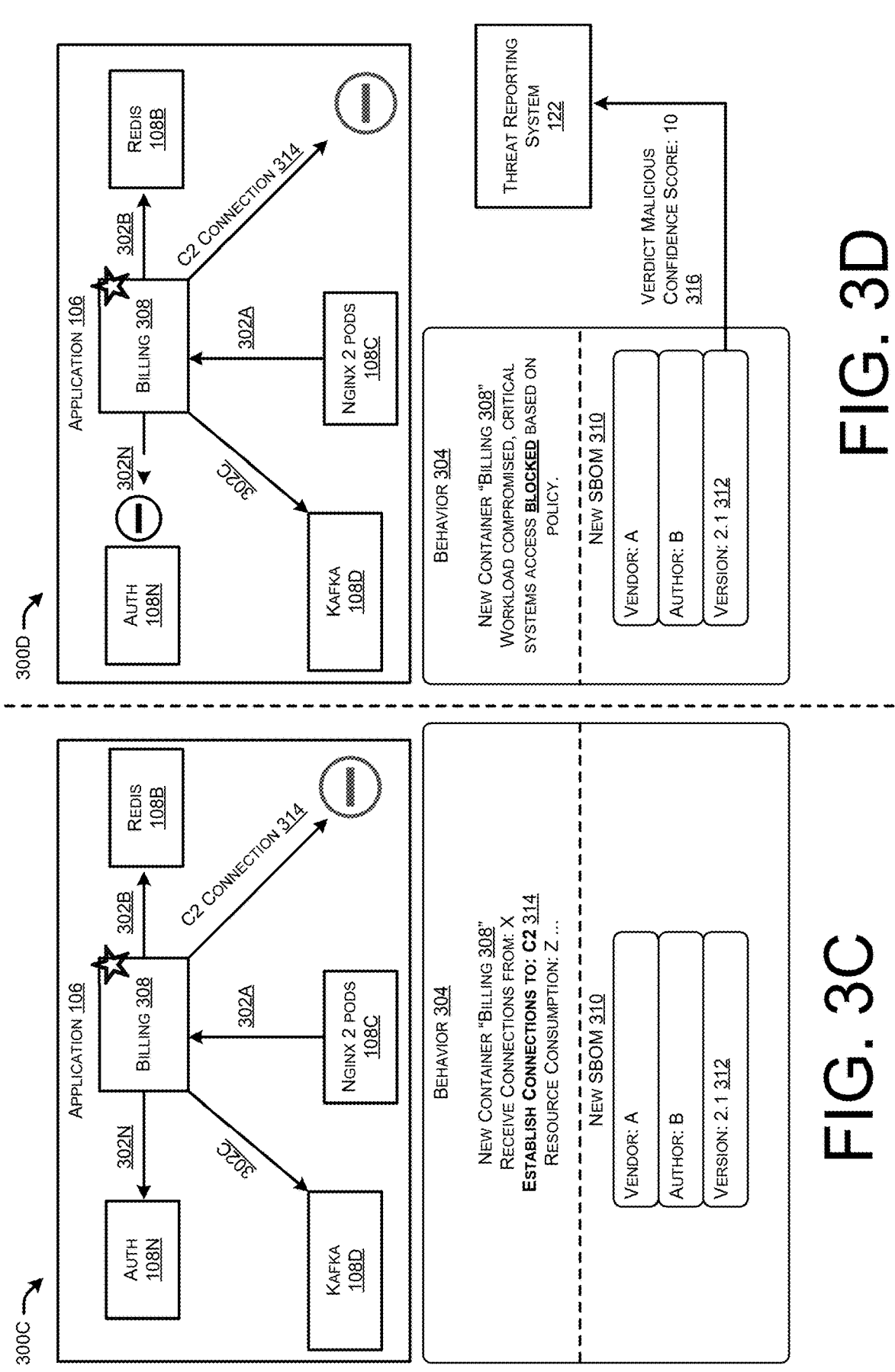

FIG. 3C illustrates an example environment 300C where potential malicious behavior is identified. In some examples, the environment 300C illustrates an outcome associated with the behavior component 114 performing one or more operations described above. For instance, the behavior component 114 may monitor the behavior of the new billing container 308 after the new workload is deployed.

As illustrated, a new, C2 connection 314 is identified. As noted above, a C2 connection is generally indicative of a ransomware attack, 0-day attack, and/or a supply chain attack. Accordingly, allowing the C2 connection to form to a particular destination (e.g., to a bad actor) would allow the bad actor to have backdoor access to the application 106. As illustrated, the behavior 304 of the new container 308 identifies the new connection 314 as a new, potentially malicious behavior (illustrated as bolded). As noted above, changes in the new SBOM 310 are also identified (e.g., version 2.1 312). Accordingly, the behavior component 114 can easily and in real-time trace the malicious behavior (e.g., the new C2 connection 314) back to the exact SBOM component of the new SBOM 310.

FIG. 3D illustrates an example environment 300C where an attack is mitigated and actions are performed. In some examples, the environment 300D illustrates an outcome associated with the analysis and action component 116 performing one or more operations described above. As illustrated, the C2 connection 314 and any other critical connection(s) 302 (e.g., such as connection 302N) are blocked in real-time, thereby mitigating the attack. As noted above, the action(s) taken by the analysis and action component 116 may be based on one or more policies. Additionally, an indication that the new billing container 308 is compromised is displayed. The action and analysis component may determine a confidence score and output the verdict data 316 to the threat reporting system 122 in real-time. As illustrated, in this example the verdict data 316 comprises an indication that the potential malicious behavior is malicious (e.g., "verdict malicious") and the confidence score associated with the behavior (e.g., "confidence score: 10"). In some examples, the verdict data 316 may be sent to a vulnerability database to be updated in real-time, such that the new billing container 308 is blocked from being deployed by additional user(s) of the network 102.

Figure 4:
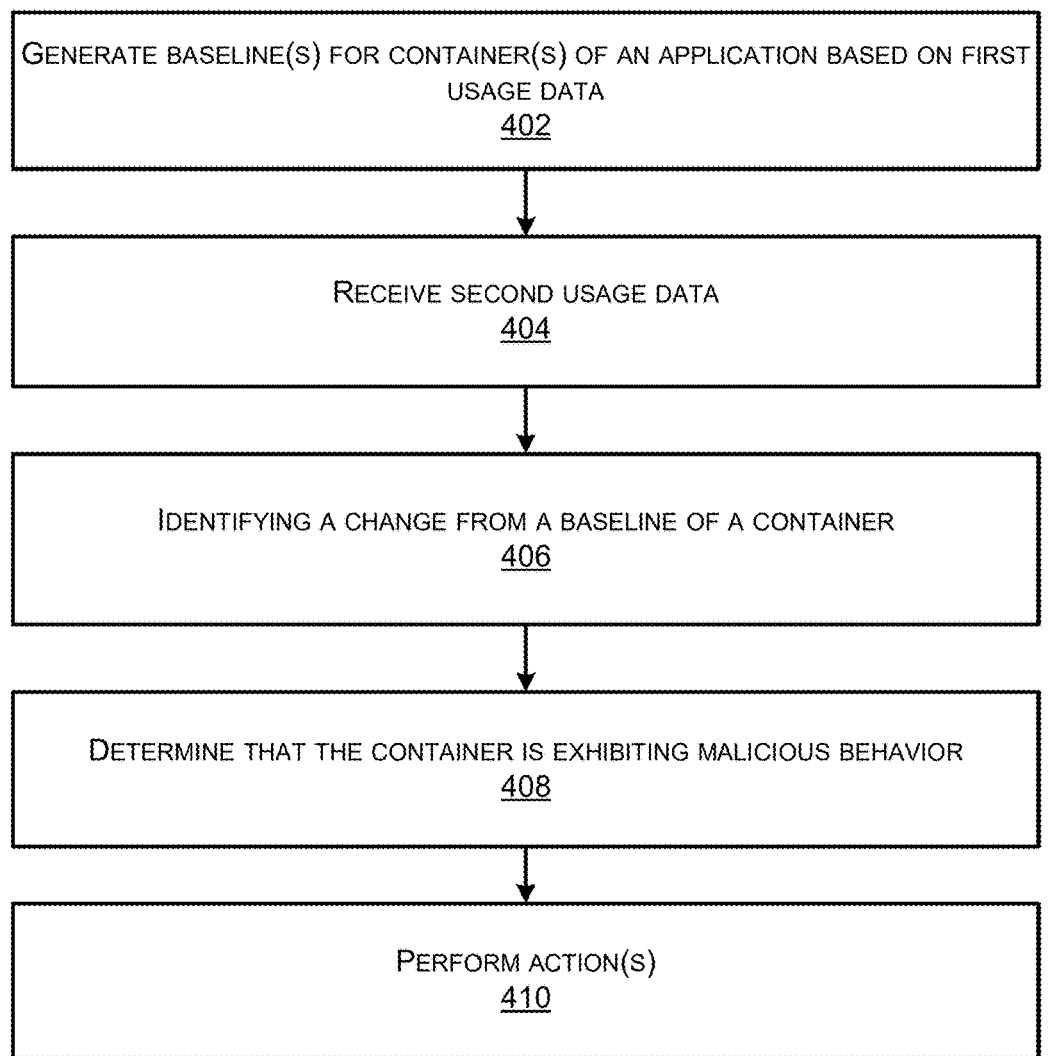
FIG. 4 illustrates a flow diagram of an example method for identifying and mitigating attacks in a runtime environment associated with the system described in FIGS. 1-3.

FIG. 4 illustrates a flow diagram of an example system 400 for identifying and mitigating attacks in a runtime environment associated with the system described in FIGS. 1-3. In some instances, the steps of system 400 may be performed by one or more devices (e.g., controller 104, etc.) that include one or more processors and one or more non-transitory computer-readable media storing computer-executable instructions that, when executed by the one or more processors, cause the one or more processors to perform operations of system 400.

At 402, the system may generate baseline(s) for container(s) of an application based on first usage data. For instance, the application may correspond to a cloud-native application. In some examples, the baseline(s) are generated by the baseline component 110 described above. In some examples, the controller is implemented as part of a cloud native environment or as part of a software package deployed on premise at a site of a customer. In some examples, the baseline for the container comprises a baseline software bill of materials (SBOM) and one or more baseline behaviors associated with the container, the baseline SBOM being generated based on one or more SBOMs included in the first usage data.

At 404, the system may receive second usage data. For instance, the system may receive the second usage data from the application. In some examples, the system may receive the second usage data via a service mesh envoy proxy, using a daemon set, a lightweight agent, an API gateway, etc. In some examples, the second usage data is received in response to an event, the event comprising an update to the container or a new functionality or a new code being pushed to the container.

At 406, the system may identify a change from a baseline of a container. For instance, as noted above, the system may identify a difference between a baseline SBOM and the SBOM of the new container. Additionally or alternatively, the system may identify a change from a baseline behavior of the container, based on monitoring the new workload after deployment.

At 408, the system may determine that the container is exhibiting malicious behavior. In some examples, determining that the container is exhibiting the malicious behavior is based at least in part on identifying a difference between a baseline behavior associated with the container and a new behavior indicated in the second usage data; and generating, using a machine learning model, a confidence score indicating that the new behavior is malicious. In some examples, the malicious behavior comprises one of forming a new control connection, privilege escalation, data exfiltration, or causing the application to crash.

At 410, the system may perform action(s). In some examples, the action(s) may be performed by the analysis and action component described above. In some examples, performing the action comprises one or more of: sending instructions to the application to cause the application to block one or more connections of the container; generating and sending an alert to a user interface of a user associated with the application; sending, to a threat intelligence database, an indication of the malicious behavior and a library associated with a change in a SBOM of the container; or storing, in a vulnerability database associated with the network, the indication of the malicious behavior and the library associated with the change in the SBOM of the container. In some examples, the action(s) are based on one or more policies.

In this way, the system may identify, workloads that may not be identified as malicious by traditional approaches, but are being used in the wrong way and may have malicious behaviors. Moreover, the system may mitigate the attack by blocking connections in real-time after the workload is deployed. Further, by offering granular visibility using the SBOM baseline for a container, the system may provide greater accuracy and verdicts as to whether behavior is malicious. Additionally, by tracking down to the exact library that provided a change that caused the new malicious behavior of a container, the system can trace back to the exact package that is malicious, which can be shared across the cloud-native ecosystem. That is, the system may share the intelligence across the ecosystem to prevent the same malicious workload from being deployed through the CI/CD pipeline.

Figure 5:
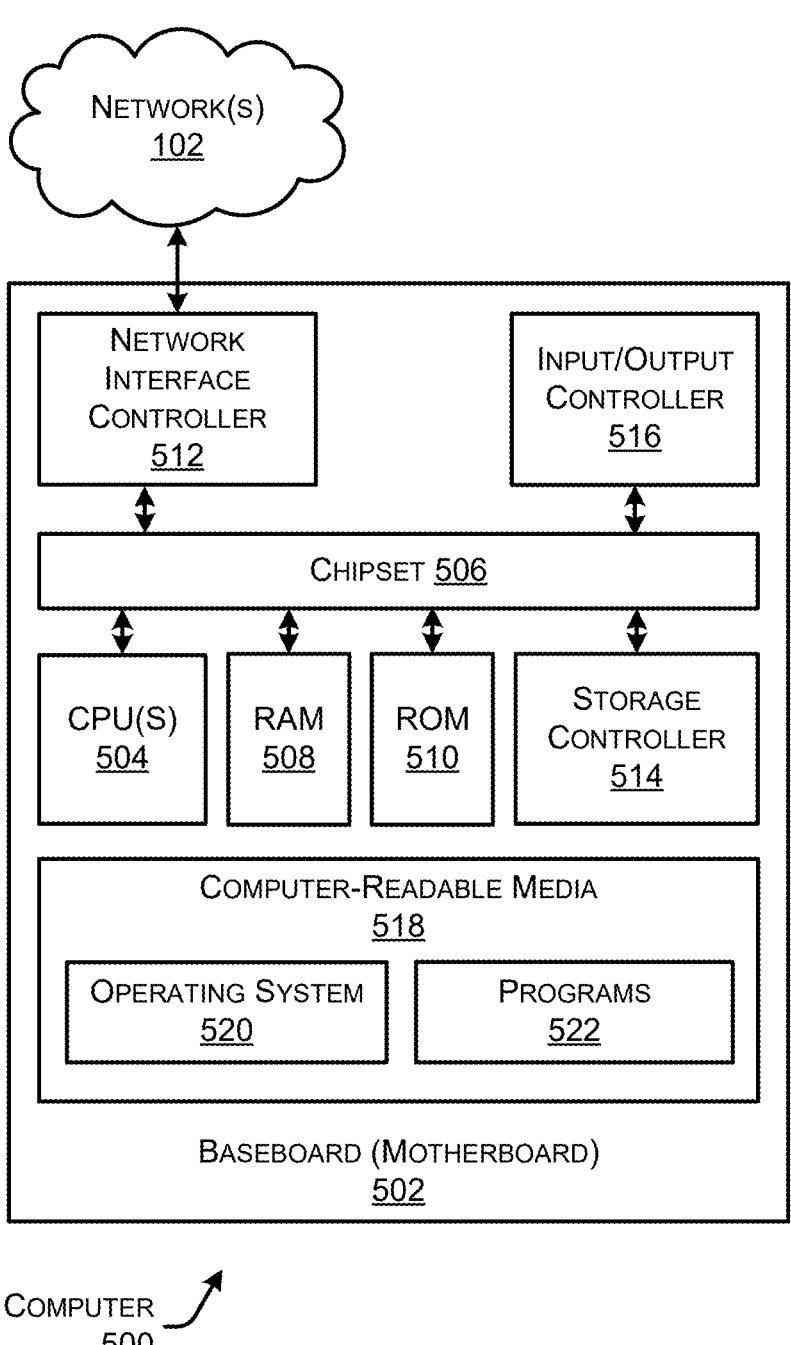
FIG. 5. is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a controller 104 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the controller 104 and/or any components included therein, may be supported by one or more devices similar to computer 500. Stated otherwise, some or all of the operations performed by the controller 104 and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a controller 104 and/or any other device. The computer 500 may include one or more hardware processors (processors) configured to execute one or more stored instructions. The processor(s) may comprise one or more cores. Further, the computer 500 may include one or more network interfaces configured to provide communications between the computer 500 and other devices, such as the communications described herein as being performed by the controller 104 and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure. For instance, the programs 522 may cause the computer 500 to perform techniques including generating, based on first usage data, a baseline for a container of a plurality of containers associated with an application; receiving, from the application, second usage data associated with the container; identifying, based on the second usage data, a change from the baseline associated with the container; determining that the container is exhibiting malicious behavior; and performing, based on the malicious behavior, an action.

In this way, the computer 500 can identify workloads that may not be identified as malicious by traditional approaches, but are being used in the wrong way and may have malicious behaviors. Moreover, the computer may mitigate the attack by blocking connections in real-time after the workload is deployed. Further, by offering granular visibility using the SBOM baseline for a container, the computer may provide greater accuracy and verdicts as to whether behavior is malicious. Additionally, by tracking down to the exact library that provided a change that caused the new malicious behavior of a container, the computer can trace back to the exact package that is malicious, which can be shared across the cloud-native ecosystem. That is, the computer may share the intelligence across the ecosystem to prevent the same malicious workload from being deployed through the CI/CD pipeline.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a controller of a network, the method comprising:

receiving first usage data including a software bill of materials (SBOM) associated with an application;

deploying the application to a container of a plurality of containers;

generating, based on first usage data, a baseline for the container of the plurality of containers that is hosting the application, the baseline comprising a baseline behavior of the application and the SBOM;

storing an updated SBOM associated with a software package deployed for the application;

receiving, from the application, second usage data associated with the container;

identifying, based on the second usage data, a change in behavior of the application from the baseline behavior of the application;

determining that the change in the behavior of the application represents malicious behavior;

using the updated SBOM that is stored, correlating the malicious behavior to a software component in the updated SBOM;

performing, based on the malicious behavior, an action associated with the software component.

2. The method of claim 1, wherein the controller is implemented as part of a cloud native environment or as part of a software package deployed on premise at a site of a customer.

3. The method of claim 1, wherein the application comprises a cloud-native application.

4. The method of claim 1, wherein the baseline for the container comprises a baseline software bill of materials (SBOM) and one or more baseline behaviors associated with the container, the baseline SBOM being generated based on one or more SBOMs included in the first usage data.

5. The method of claim 1, wherein determining that the container is exhibiting the malicious behavior is based at least in part on:

identifying a difference between a baseline behavior associated with the container and one or more new behaviors indicated in the second usage data; and generating, using a machine learning model, a confidence score indicating that the new behavior is malicious.

6. The method of claim 1, wherein the malicious behavior comprises one of forming a new control connection, privilege escalation, data exfiltration, or causing the application to crash.

7. The method of claim 1, wherein performing the action comprises one or more of:

sending instructions to the application to cause the application to block one or more connections of the container;

generating and sending an alert to a user interface of a user associated with the application;

sending, to a threat intelligence database, an indication of the malicious behavior and a library associated with a change in a SBOM of the container; or storing, in a vulnerability database associated with the network, the indication of the malicious behavior and the library associated with the change in the SBOM of the container.

8. The method of claim 1, wherein the second usage data is received in response to an event, the event comprising an update to the container or a new functionality or a new code being pushed to the container.

9. A system comprising:

one or more processors; and one or more non-transitory computer-readable media storing computer-executable instructions that, when executed by the one or more processors, cause the one or more processors to perform operations comprising:

receiving first usage data including a software bill of materials (SBOM) associated with an application;

deploying the application to a container of a plurality of containers;

generating, based on first usage data, a baseline for the container of the plurality of containers that is hosting the application, the baseline comprising a baseline behavior of the application and the SBOM;

storing an updated SBOM associated with a software package deployed for the application;

receiving, from the application, second usage data associated with the container;

identifying, based on the second usage data, a change in behavior of the application from the baseline behavior of the application;

determining that the change in the behavior of the application represents malicious behavior;

using the updated SBOM that is stored, correlating the malicious behavior to a software component in the updated SBOM;

performing, based on the malicious behavior, an action associated with the software component.

10. The system of claim 9, wherein the system is implemented by a controller, the controller being implemented as part of a cloud native environment or as part of a software package deployed on premise at a site of a customer.

11. The system of claim 9, wherein the application comprises a cloud-native application.

12. The system of claim 9, wherein the baseline for the container comprises a baseline software bill of materials (SBOM) and one or more baseline behaviors associated with the container, the baseline SBOM being generated based on one or more SBOMs included in the first usage data.

13. The system of claim 9, wherein determining that the container is exhibiting the malicious behavior is based at least in part on:

identifying a difference between a baseline behavior associated with the container and one or more new behaviors indicated in the second usage data; and generating, using a machine learning model, a confidence score indicating that the new behavior is malicious.

14. The system of claim 9, wherein the malicious behavior comprises one of forming a new control connection, privilege escalation, data exfiltration, or causing the application to crash.

15. The system of claim 9, wherein performing the action comprises one or more of:

sending instructions to the application to cause the application to block one or more connections of the container;

generating and sending an alert to a user interface of a user associated with the application;

sending, to a threat intelligence database, an indication of the malicious behavior and a library associated with a change in a SBOM of the container; or storing, in a vulnerability database associated with a network, the indication of the malicious behavior and the library associated with the change in the SBOM of the container.

16. The system of claim 9, wherein the second usage data is received in response to an event, the event comprising an update to the container or a new functionality or a new code being pushed to the container.

17. One or more non-transitory computer-readable media storing computer-readable instructions that, when executed by one or more processors, cause the one or more processors to perform operations comprising:

receiving first usage data including a software bill of materials (SBOM) associated with an application;

deploying the application to a container of a plurality of containers;

generating a baseline associated with the container of the plurality of containers of the application, the baseline comprising a baseline behavior of the application and the SBOM;

storing an updated SBOM associated with a software package deployed for the application;

receiving, from the application, usage data associated with the container;

identifying, based on the usage data, a change in behavior of the application from the baseline behavior of the application;

determining that the change in the behavior of the application represents malicious behavior;

using the updated SBOM that is stored, correlating the malicious behavior to a software component in the updated SBOM;

performing, based on the malicious behavior, an action associated with the software component.

18. The one or more non-transitory computer-readable media of claim 17, wherein the application comprises a cloud-native application.

19. The one or more non-transitory computer-readable media of claim 17, wherein the baseline for the container comprises a baseline software bill of materials (SBOM) and one or more baseline behaviors associated with the container, the baseline SBOM being generated based on one or more SBOMs included in other usage data.

20. The one or more non-transitory computer-readable media of claim 17, wherein the usage data is received in response to an event, the event comprising an update to the container or a new functionality or a new code being pushed to the container.

* * * * *